United States Patent Office 3,647,889
Patented Mar. 7, 1972

3,647,889
POLYFLUOROISOPROPOXYALKYL ETHERS
Louis G. Anello, Orchard Park, and Richard F. Sweeney, Elma, N.Y., and Morton H. Litt, Cleveland, Ohio, assignors to Allied Chemical Corporation, New York, N.Y.
No Drawing. Continuation-in-part of application Ser. No. 633,359, Apr. 25, 1967. This application May 25, 1970, Ser. No. 40,434
Int. Cl. C07c 43/00
U.S. Cl. 260—615 R
19 Claims

ABSTRACT OF THE DISCLOSURE

Compounds of the formula:

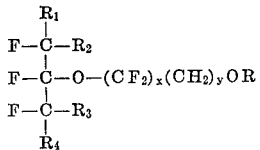

wherein $R_1$–$R_4$ are each independently selected from the group consisting of F, Cl and perfluoroalkyl, and together can form a perfluorocycloalkylene group, with the proviso that $R_1$–$R_4$ may not contain more than two chlorine atoms, $x$ is an integer from 1–81, $y$ is an integer from 1–81, and R is a member selected from the group consisting of alkyl and perhydrofluoroalkyl; are useful as insulator and condenser fluids, hydraulic fluids, lubricants and heat-transfer media. These compounds are also surface-active and are useful as anti-wetting agents.

CROSS-REFERENCES TO RELATED APPLICATIONS (1) This application is a continuation-in-part of copending application of Anello et al., entitled "Telomers and Process for the Preparation Thereof," Ser. No. 633,359, filed Apr. 25, 1967 now Pat. No. 3,514,487.

(2) U.S. Pat. 3,453,333 to Litt et al., entitled "Fluorinated Ethers," issued July 1, 1969.

(3) Copending application of Litt et al., entitled "Fluorinated Ethers," Ser. No. 513,574, filed Dec. 13, 1965 now Pat. No. 3,470,256.

(4) Copending application of Anello et al., entitled "Novel Fluorinated Alcohols," Ser. No. 721,089, filed Apr. 12, 1968 and now abandoned.

These applications and patent are hereby incorporated by reference.

SUMMARY OF THE INVENTION

This invention relates to polyfluoroisopropoxyalkyl ethers having the general formula:

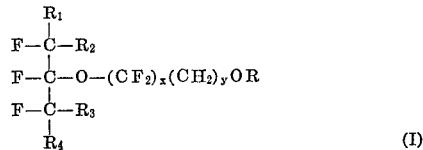

wherein $R_1$–$R_4$ are each independently selected from the group consisting of F, Cl and perfluoroalkyl, and together can form a perfluorocycloalkylene group, with the proviso that $R_1$–$R_4$ may not contain more than two chlorine atoms, $x$ is an integer from 1–81, $y$ is an integer from 1–81, and R is a member selected from the group consisting of alkyl and perhydrofluoroalkyl.

The criticality in the structure of these compounds is in the polyfluoroisoalkoxyalkyl tail portion of the molecule wherein a carbon atom links an oxygen atom and a fluorine atom and wherein two fluoroalkyl linkages satisfy the remaining valences of the carbon atom linking the oxygen and fluorine atoms. The fluoroalkyl linkages are characterized by the presence of at least one fluorine atom on each carbon atom which is adjacent the carbon atom which links the oxygen and fluorine atoms. The fluoroalkyl linkages may, when taken together, form a perfluorocycloalkylene structure. The term polyfluoroisoalkoxyalkyl herein shall be understood as including such cycloaliphatic structures.

In the above Formula I, $R_1$–$R_4$ may be the same or different. When the $R_1$–$R_4$ groups are perfluoroalkyl, the perfluoroalkyl group may be straight-chain or branched-chain.

Similarly, the R group may be straight-chain or branched-chain. The term perhydrofluoroalkyl is intended to denote alkyl radicals having at least one hydrogen atom and one fluorine atom in the radical and substituted only with hydrogen and fluorine atoms.

The novel ethers of the invention are thermally stable and are useful as heat transfer agents, hydraulic fluids, gyro-fluids, lubricants and as insulator and condenser fluids. Specific useful applications include use as vapor phase coolants and dielectrics for electrical equipment and as temperature differential fluids in thermometric devices.

The novel ethers of the invention also exhibit excellent surface activity and may be used as anti-wetting agents by conventional techniques. The anti-wetting properties may be taken advantage, for example, in improving heat transfer in heat exchangers by coating the heat exchange surfaces with the liquid alkanol-esters, or solvent solutions of the same. Thus, a better heat transfer is effected between surfaces in which the condensate does not wet the heat exchanger surfaces, as compared with surfaces in which the condensate does wet the heat exchange surfaces. As is further well known in the art, anti-wetting agents are useful as coatings on the interiors of containers. The non-wettable surfaces thus produced make it possible to dispense liquid materials from the containers without leaving a residue. Yet another example of the use of non-wetting agents is in the treatment of paper and textiles to impart water and oil repellency thereto. The alkanol esters may be applied from any convenient solvent medium. Illustrative useful solvents from which the novel alkanol-esters may be applied to substrates to be treated include 1,1,2 - trichlorotrifluoroethane, trichloroethylene and toluene. The solutions of the alkanol-esters are applied to the substrates by conventional dipping, spraying or brushing techniques and the treated substrates are then dried to remove the solvent.

DETAILED DESCRIPTION OF THE INVENTION AND OF THE PREFERRED EMBODIMENTS

Referring to Formula I above, the $R_1$–$R_4$ groups are preferably all F. When $R_1$–$R_4$ are perfluoroalkyl groups, the preferred carbon content is from 1–6. When $R_1$–$R_4$ form a perfluorocycloalkylene group, the preferred carbon content of the cyclic ring is from 4–6.

Preferably, $x$ and $y$ are each from 1–20 and, still preferably, from 1–15. In the preferred embodiment, $x$ and $y$ are both even integers from 2–14.

The R group may contain from 1–12 carbon atoms, preferably from 1–6 carbon atoms.

The compounds of the invention may be prepared by reacting a corresponding telomer of the formula:

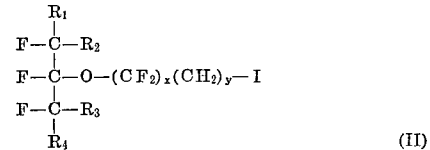

(II)

wherein $R_1$–$R_4$, $x$ and $y$ are as defined above, and have the desired values, with a telomerizable unsaturated ether of the formula:

$$CX_2=CH-OR \qquad (III)$$

wherein X is H or F and R is as defined above, followed by reducing the resulting iodo-containing compound with LiAlH$_4$ or with zinc and alcohol to substitute a hydrogen atom for the iodine atom. Preparation of telomer precursors of Formula II will be discussed in more detail hereafter. The unsaturated ethers of Formula III are a known class of compounds.

The novel ethers of the invention wherein R, in above Formula I, is a perhydrofluoroalkyl group are preferably prepared from the corresponding polyfluoroisoalkoxy alkanols of the formula:

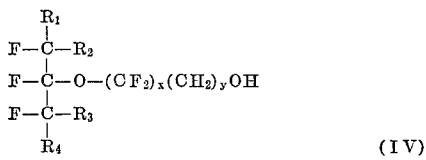
(IV)

wherein $R_1$–$R_4$, $x$ and $y$ are as defined above, by reacting such alcohols with polyfluoroethylenes in the presence of the corresponding alkyl metal alcoholate. This reaction is carried out by charging the chosen alcohol and the polyfluoroethylene into a pressure vessel together with a catalytic amount of an alkali metal, such as sodium, and heating the contents of the pressure vessel to reflux temperature, usually in the order of 150–200° C., for at least about 16 hours. The resulting perhydrofluoroalkyl-substituted product may be recovered from the reaction mixture by fractional distillation.

The novel ethers of the invention, wherein R, in above Formula I is alkyl, are preferably prepared by reacting an alcohol of Formula IV with dialkyl sulfates in a strongly alkaline medium comprising an alkali metal hydroxide, such as sodium hydroxide or potassium hydroxide. In operation, equimolar amounts of the reagents are heated at reflux temperature for a period of at least 5 hours. The resulting ether product is preferably subjected to an acid wash and may be fractionally distilled to obtain a purer form of the product. The alcohol starting materials of Formula IV may be prepared by a variety of routes. The preferred routes depend on whether $x$ and $y$ in Formula IV are odd or even and upon the lengths of the chain.

Alcohols wherein $x$ and $y$ are both even integers may be prepared by reacting a telomer of the formula:

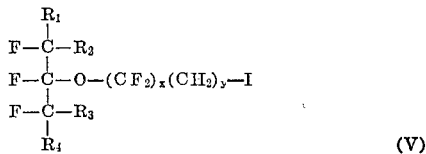
(V)

wherein $x$ and $y$ are even integers, with SO$_3$ to produce the corresponding polysulfate, followed by hydrolysis of the polysulfate with 35–50% H$_2$SO$_4$ at about 100° C. to the desired alcohol. This method is taught in copending application Ser. No. 633,359.

When $x$ in Formula IV is to be an odd number from 1 to 19 inclusive and $y$ is to be 1, the alcohols can be prepared by reacting the perhaloisoalkoxy alkyl iodide wherein $x$ is an even number from 2 to 20, and $y$ is zero, i.e.

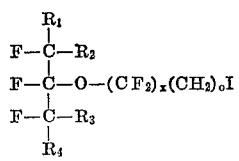

with SO$_3$ to form a mixture of the acyl fluoride and the perhaloalkoxy fluoroalkyl pyrosulfuryl fluoride, reacting the combined reaction products with an alcohol such as methanol, ethanol, and the like, to produce the ester and reducing the ester to the alcohol with lithium aluminum hydride (LiAlH$_4$) as a reducing agent. This is taught in copending application Ser. No. 721,089.

When $x$ is an even number from 2–20 and $y$ is 1, the alcohol may be prepared by treating the telomer iodide of a compound having the desired final number of

—CF$_2$— groups and two —CH$_2$— groups with alcoholic KOH to remove the iodine and form the perhaloisopropoxy fluoroalkyl ethene, oxidizing the ethene with KMnO$_4$ to the acid, converting the acid to a lower alkyl ester and reducing the ester to the alcohol with lithium aluminum hydride.

When $x$ is an even number from 2 to 20, and $y$ is an odd or even number from 3 to 20, the alcohol may be produced by reduction of the corresponding iodo alcohol with lithium aluminum hydride (LiAlH$_4$), or with zinc and alcohol. The iodo alcohol starting materials may be prepared by reacting a perhaloisopropoxy fluoroalkyl telomer iodide having "$x$" CF$_2$ groups in the alkyl chain with an allyl alcohol having $y$-2 (i.e. 1–17) CH$_2$ groups in the chain attached to the terminal OH group to produce an iodohydrin, followed by reducing the iodohydrin with zinc and alcohol, for example, to the corresponding alcohol.

When $x$ is an odd number from 1 to 19 and $y$ is an even or odd number from 4 to 19, the resulting alcohols can be prepared by reacting a perhaloisoalkoxy acid having an odd number of CF$_2$ groups in the fluoroalkane chain with Ag$_2$O to form the silver salt; reacting the silver salt with iodine to form the perhaloisoalkoxy perfluoroalkyl iodide, then reacting the perhaloisoalkoxy perfluoroalkyl iodide with an unsaturated alcohol such as allyl alcohol, and removing the iodine by reduction, such as with zinc and alcohol.

When $x$ is an even number from 2 to 20 and $y$ is 1 to 3, the alcohols can be made by converting the appropriate iodide to the pyrosulfate with SO$_3$ or to the hydrosulfate with oleum, and hydrolysis of the fluoroalkoxy dialkyl pyrosulfate or hydrogen sulfate to the alcohol with aqueous acid.

Alcohols according to Formula IV having —CH$_2$— chains of any desired length of two or more carbon atoms can be prepared by reacting a suitable telomer iodide with ethylene or with an ethylenically unsaturated alcohol such as allyl alcohol (CH$_2$=CH—CH$_2$OH). In the latter case iodine is removed by reduction such as with zinc and alcohol.

When alcohols with an odd number of —CF$_2$— groups are desired, these can be obtained by reacting a perhaloisoalkoxy perfluoroalkyl iodide having an even number of —CF$_2$— groups, with SO$_3$, esterifying the resulting reaction products, reducing the ester to the alcohol such as with LiAlH$_4$ and reacting the alcohol with p-toluene sulfonyl chloride and metallic iodide to form the iodide containing m-1 (CF$_2$) groups and one CH$_2$ group.

The telomer starting materials for these reactions, and preparation thereof, are disclosed in our co-pending parent application Ser. No. 633,359, mentioned supra. Essentially, these telomer starting materials may be prepared by telomerizing corresponding telogens of the formula

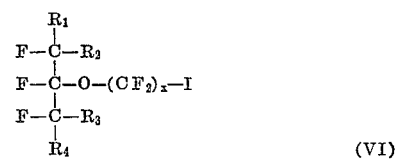
(VI)

wherein $R_1$–$R_4$ are as defined above and $x$ is 1 or 2. The telomerization may be effected with tetrafluoroethylene followed by telomerization with ethylene, or with ethylene alone.

The reaction between the telogen and the tetrafluoroethylene and/or ethylene compound is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100° C. and 350° C., preferably between about 150–200° C. Furthermore, although the reaction may be conducted at atmospheric pressure, superatmospheric pressures, for example, up to about 20,000 p.s.i.g. may be used with pressures between about 100 p.s.i.g. and about 10,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of tetrafluoroethylene is used, for example, the reaction time is dependent on temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour to about 48 hours.

If desired, the reaction may be conducted by use of a catalyst or light of sufficient intensity to initiate the free radical reaction. Illustrative free radical generating catalysts include azonitriles such as alpha,alpha'-azobisisobutyronitrile and organic peroxides such as benzoyl peroxide, acetyl peroxide and pelargonyl peroxide. The use of such initiators allows operation at a lower temperature but gives a somewhat more complex product mixture because of incorporation of catalyst fragments in the telomer mixture, or results in a higher molecular weight distribution in the product telomer.

The telomerization reaction may be carried out in various ways. For example, the telogen and the unsaturated compound may be introduced into an autoclave which is then sealed and heated, preferably with agitation such as by stirring or shaking, until the pressure drop indicates that the reaction has proceeded to the desired extent. In such an operation, the molar ratio of unsaturated compound to telogen is of importance in determining the molecular weight of the telomer product. In general, the average molecular weight of the product is dependent upon the molar ratio of unsaturated compound to telogen; the higher the unsaturated compound: telogen molar ratio, the higher will be the average molecular weight of the telomer product. The ratio of telogen to unsaturated compound may vary from about 1:75 to as high at 200:1, the preferred ratio for batchwise operation being about 1:1 to 2:1 in the production of relatively low molecular weight telomers, i.e. telomers containing up to about 6 or 7 monomer units per telomer molecule. On the other hand, in a constant pressure reaction, i.e. where a constant pressure of unsaturated compound is maintained above the liquid phase comprising the telogen during the reaction, the molecular weight of telomer product may be controlled by varying the pressure of the unsaturated compound. In general, the higher the pressure of the unsaturated compound, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties.

The telogens of Formula VI for the preparation of the telomers described above may be prepared by reaction of an appropriate halogenated ketone with an ionizable fluoride salt to form a fluorinated organic salt and then reacting the organic salt with a halogen other than fluorine (e.g. iodine, bromine) and an appropriate olefin to form the desired polyhaloisoalkoxyalkyl halide. The reactions are more fully described in U.S. Pat. 3,453,333 to Litt et al., entitled "Fluorinated Ethers," issued July 1, 1969 and copending application of Litt et al., Ser. No. 513,574, filed Dec. 13, 1965. For example, as is described in Examples 1 and 3 of U.S. Pat. 3,453,333, the telogen perfluoroisopropoxyethyl iodide, $(CF_3)_2CFOCF_2CF_2I$, may be prepared by reacting hexafluoroacetone with potassium fluoride in an acetonitrile solvent to produce the corresponding addition compound having the formula $$(CF_3)_2CFO^-K^+$$

and thereafter reacting this addition compound with tetrafluoroethylene and iodine in the presence of an inert organic solvent to form the desired perfluoroisopropoxyethyl iodide, $(CF_3)_2CFOCF_2CF_2I$.

Illustrative compounds within the scope of the invention are shown as follows:

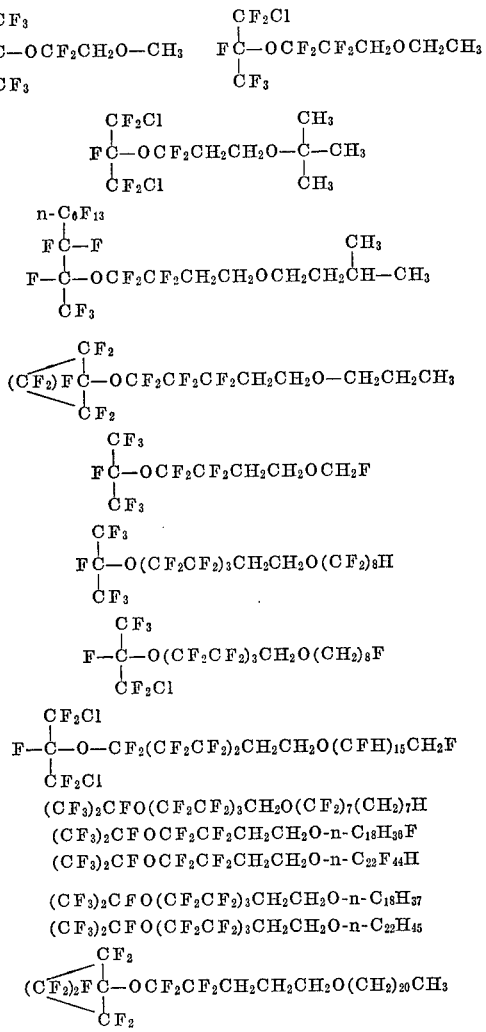

$$CF_3$$
$$F\overset{|}{\underset{|}{C}}-O(CF_2)_{20}(CH_2)_{20}O-(CH_2)_{20}-CF_3$$
$$CF_3$$

$$CF_3$$
$$F\overset{|}{\underset{|}{C}}-O(CF_2)_{19}CH_2O-CH_2CF_3$$
$$CF_3$$

$$CF_3$$
$$F\overset{|}{\underset{|}{C}}-O(CF_2)_{20}CH_2O-CH_3$$
$$CF_2Cl$$

$$CF_3$$
$$F\overset{|}{\underset{|}{C}}-O(CF_2)_2(CH_2)_{20}OCH_2CF_2CH_3$$
$$CF_3$$

$$(CF_3)_2CFO(CF_2)_{81}(CH_2)_{81}OCH_3$$
$$(CF_3)_2CFO(CF_2)_{15}(CH_2)_{15}OC_2H_5$$
$$(CF_3)_2CFO(CF_2)_{14}(CH_2)_{14}OCF_2CF_2H$$

$$CF_3$$
$$F\overset{|}{\underset{|}{C}}-O(CF_2)_{20}(CH_2)_3OCH_2CH_3$$
$$CF_3$$

$$CF_3$$
$$F\overset{|}{\underset{|}{C}}-OCF_2(CH_2)_4OCH_2CF_3$$
$$CF_3$$

$$CF_3$$
$$F\overset{|}{\underset{|}{C}}-O(CF_2)_{19}(CH_2)_{19}OCFHCHF_2$$
$$CF_3$$

$$CF_3$$
$$F\overset{|}{\underset{|}{C}}-OCF_2(CH_2)_{19}O(CF_2)_6CH_3$$
$$CF_2$$
$$CF_3-\overset{|}{\underset{|}{C}}-CF_3$$
$$F$$

$$CF_3$$
$$F\overset{|}{\underset{|}{C}}-O(CF_2)_2(CH_2)_2OCH_2CF_3$$
$$CF_3$$

$$CF_3$$
$$F\overset{|}{\underset{|}{C}}-O(CF_2)_{10}(CH_2)_{10}OCF_2CH_3$$
$$CF_3$$

$$(CF_3)_2CFOCF_2CF_2CH_2CH_2OCH_3$$
$$(CF_3)_2CFO(CF_2CF_2)_2CH_2CH_2OCH_3$$
$$(CF_3)_2CFO(CF_2CF_2)_3CH_2CH_2OCH_3$$
$$(CF_3)_2CFO(CF_2CF_2)_7CH_2CH_2OCH_2CH_3$$
$$(CF_3)_2CFO(CF_2CF_2)_4(CH_2CH_2)_2OCH(CH_3)_2$$

The following examples illustrate practice of the invention. Parts and percentages are by weight unless otherwise indicated.

EXAMPLE 1

Preparation of 1,1,2,2-tetrahydrotetrafluoro-4-heptafluoro-isopropoxybutyl methyl ether [$(CF_3)_2CFOCF_2CF_2CH_2CH_2OCH_3$]

A 500 ml. 3-necked flask is charged with 165 g. (0.5 mole) of 1,1,2,2 - tetrahydrotetrafluoroisopropoxybutanol, 52 g. (0.50 mole) of dimethylsulfate and 40 g. of a 50% aqueous solution of NaOH (20 g., 0.25 mole). The mixture is stirred and heated to 100° C. for 12 hours. The resulting product is washed with water, dried and distilled to yield a product identified as $(CF_3)_2CFOCF_2CF_2CH_2CH_2OCH_3$.

EXAMPLE 2

Preparation of 1,1-dihydro-2,2-difluoro-2-heptafluoroisopropoxyethyl-1'-hydro-1',1',2',2'-tetrafluoroethyl ether [$(CF_3)_2CFOCF_2CH_2OCF_2CF_2H$]

A 300 ml. autoclave, charged with 100 g. (0.305 mole) of $(CF_3)_2CFOCF_2CH_2OH$, 1.5 g. of sodium and 50 g. (0.5 mole) of $CF_2=CF_2$, is rocked for sixteen hours at 180° C. and a pressure of about 40 atmospheres. After cooling, the residual pressure is released through a Dry-Ice trap. The liquid content of the vessel is then distilled to yield a product identified as $$(CF_3)_2CFOCF_2CH_2OCF_2CF_2H$$

We claim:
1. Compounds of the formula:

$$\begin{array}{c} R_1 \\ | \\ F-C-R_2 \\ | \\ F-C-O-(CF_2)_x(CH_2)_yOR \\ | \\ F-C-R_3 \\ | \\ R_4 \end{array}$$

wherein:
 (a) $R_1$–$R_4$ are each independently selected from the group consisting of F, Cl and perfluoroalkyl, and together can form a perfluorocycloalkylene group, with the proviso that $R_1$–$R_4$ may not contain more than two chlorine atoms,
 (b) $x$ is an integer from 1–81,
 (c) $y$ is an integer from 1–81, and
 (d) R is a member selected from the group consisting of alkyl and perhydrofluoroalkyl.

2. Compounds according to claim 1 in which $x$ and $y$ are each from 1–20.
3. Compounds according to claim 1 in which $x$ and $y$ are each from 1–15.
4. Compounds according to claim 3 in which $R_1$–$R_4$ are all F.
5. Compounds according to claim 4 in which R is alkyl.
6. Compounds according to claim 4 in which R is perhydrofluoroalkyl.
7. Compounds according to claim 4 in which $x$ is an odd number from 1–19 and $y$ is 1.
8. Compounds according to claim 4 in which $x$ is an even number from 2–20 and $y$ is 1.
9. Compounds according to claim 4 in which $x$ is an even number from 2–20 and $y$ is an odd or even number from 3–20.
10. Compounds according to claim 4 in which $x$ is an odd number from 1–19 and $y$ is an even or odd number from 4–19.
11. Compounds according to claim 4 in which $x$ is an even number from 2–20 and $y$ is 1–3.
12. Compounds according to claim 4 in which $x$ and $y$ are even numbers from 2–14.
13. Compounds according to claim 12 in which R is alkyl.
14. Compounds according to claim 12 in which R is perhydrofluoroalkyl.
15. A compound according to claim 1 which is $(CF_3)_2CFOCF_2CF_2CH_2CH_2OCH_3$.
16. A compound according to claim 1 which is $(CF_3)_2CFO(CF_2CF_2)_2CH_2CH_2OCH_3$.
17. A compound according to claim 1 which is $(CF_3)_2CFO(CF_2CF_2)_3CH_2CH_2OCH_3$.
18. A compound according to claim 1 which is $(CF_3)_2CFO(CF_2CF_2)_7CH_2CH_2OCH_2CH_3$.
19. A compound according to claim 1 which is $(CF_3)_2CFO(CF_2CF_2)_4(CH_2CH_2)_2OCH(CH_3)_2$.

References Cited
UNITED STATES PATENTS

| | | | |
|---|---|---|---|
| 2,973,389 | 2/1961 | Weissermel et al. | 260—615 R |
| 3,435,078 | 3/1969 | Nychkz et al. | 260—615 R |
| 3,453,333 | 7/1969 | Litt et al. | 260—614 X |
| 3,514,487 | 5/1970 | Anello et al. | 260—611 X |

HOWARD T. MARS, Primary Examiner

U.S. Cl. X.R.

106—2; 117—139.5; 252—8.9, 54, 65, 67, 77; 260—611 R